United States Patent [19]

Bernardo et al.

[11] Patent Number: 5,758,574
[45] Date of Patent: Jun. 2, 1998

[54] MANUALLY WRITTEN, MACHINE READABLE CODE SYSTEM

[76] Inventors: Joseph A. Bernardo, 29 Windsor Rd., Stamford, Conn. 06905-4234; Barry L. Natale, P.O. Box 1383, Stamford, Conn. 06905-1383

[21] Appl. No.: 197,443

[22] Filed: Feb. 16, 1994

Related U.S. Application Data

[63] Continuation of Ser. No. 868,525, Apr. 15, 1992, abandoned.

[51] Int. Cl.⁶ ......................................................... B41F 17/00
[52] U.S. Cl. ...................................... 101/2; 209/584; 209/900
[58] Field of Search ................................. 101/2; 209/900, 209/584

[56] References Cited

U.S. PATENT DOCUMENTS

| | | | |
|---|---|---|---|
| 3,757,942 | 9/1973 | Gunn | 209/900 |
| 3,774,758 | 11/1973 | Sternberg | 209/900 |
| 3,988,571 | 10/1976 | Blair et al. | 101/2 |
| 4,024,380 | 5/1977 | Gunn | 209/900 |
| 4,117,975 | 10/1978 | Gunn | 209/900 |
| 4,317,030 | 2/1982 | Berghell | 209/900 |
| 4,676,162 | 6/1987 | Phipps, Sr. et al. | 101/405 |
| 5,065,000 | 11/1991 | Pusic | 364/464.03 |

*Primary Examiner*—Ren Yan
*Attorney, Agent, or Firm*—Evelyn M. Sommer

[57] ABSTRACT

A manually-written, machine-readable code system employs the application of indicia to an article, such as a mail envelope or package, having a number of rows/columns of blank spaces in a predetermined code field which are manually marked or darkened corresponding to a destination or identifying code for the article. The indicia may have been applied previously, as in the form of a preprinted envelope. The darkened spaces are machine-readable and convertible to a numeric code that can be used by an automated machinery to generate appropriate control signals for controlling its functions. The system is particularly applicable for automated sorting of mail according to postal area (Zip) codes. The indicia is readily applied to an envelope by preprinting or by using a rubber stamp or an adhesive label. The indicia can include a predetermined indicia-identifying bar code which is recognized by the mail sorting machinery in its normal bar-code-recognizing mode, and causes the machinery to switch to manually-written code recognition and conversion. The system can be used for recognition and conversion of postal area codes in different countries and/or for sorting mail intended for other countries, and may also be applied to other fields, such as, for account number codes, credit card account codes, or document, user, or product identification codes.

11 Claims, 4 Drawing Sheets

MANUALLY WRITTEN, MACHINE READABLE CODE SYSTEM

This application is a continuation of application Ser. No. 07/868,525, filed Apr. 15, 1992, now abandoned.

FIELD OF THE INVENTION

This invention generally relates to a machine-readable code system, and more particularly, to one where manually written code marks are readable by machine and used to control an associated machine process, such as high-speed automated mail sorting.

BACKGROUND ART

Postal office mail sorting operations increasingly use automated, computer-controlled machines for recognizing machine-readable destination codes printed on mail envelopes and controlling the sorting of mail into groups to be delivered to areas of common destination (e.g., "Zip") codes. For high-speed sorting, printed bar codes are universally used because they can be readily recognized by machine reading with a high degree of reliability. The postal offices typically offer incentives of reduced postal rates for mail that has the destination bar codes printed on them. To take advantage of the rate incentives, senders of bulk or volume mail utilize automated addressing machines which access an electronic address database for printing each addressee's address including the Zip code on the envelope, together with the destination bar code corresponding to the Zip code. The postal office machines sort the bar-coded envelopes into respective groups of common Zip codes for batch handling and ultimate delivery.

A typical automated mail sorting system is illustrated schematically in FIG. 1. Incoming mail envelopes 10, such as shown in FIG. 2, have bar codes 10a printed thereon which correspond to the numeric Zip codes 10b of the address. The envelopes are placed on a high-speed conveyor 11 which moves them past a reader head 12. The reader head is electronically coupled to an image processing and code conversion unit 13. The current type of reader head scans a predetermined optical field 12a as each envelope moves through the field, and transmits the scanned image field data to a temporary memory in the processing unit 13. As indicated at block 13a, the image field data is processed using optical recognition algorithms to detect the presence, location, and orientation of the bar code field within the scanned image field. At block 13b, the bar code field is processed to recognize the bar code and convert it into the corresponding numeric destination code. At block 13c, a mail sorting control signal is generated corresponding to the recognized destination code, and is output as the control signal for controlling a sorting unit 21 which has an array of routing guides for routing envelopes to the appropriate batch collection bin corresponding to the recognized destination code (dashed arrows indicate paths to other collection bins). Such sorting machinery, processing units, and image recognition algorithms are well known in the industry, and need not be explained in further detail herein.

One major problem area for such automated mail sorting systems is that mail with handwritten or printed addresses, particularly where different print fonts are used cannot be processed through such a system and must be diverted from the automated sorting line for manual sorting. Such manual sorting is labor intensive and costly for postal office operations. Senders who do not have access to automated addressing equipment that can generate bar code are not able to take advantage of the reduced postal rates offered for bar-coded mail.

High-speed automated sorting equipment are used not only by postal offices but also banks, insurance, credit card firms, governmental agencies, manufacturing, shipping, inventory control, etc., which all have need for sorting vast quantities of handwritten and machine printed articles. Although sophisticated machines are under development which can recognize and convert handwritten, typed, or printed addresses and other indicia to machine-readable form, the variability of handwriting especially and, to a lesser degree, different type fonts and typed or printed conditions always presents a significant risk of erroneous machine recognition. Currently, handwritten letters cannot be sorted by automation. Thus, the U.S. Postal Service has as one of its main goals the placement of bar codes, which are machine recognizable with very low error rates, on all letter mail.

SUMMARY OF THE INVENTION

In accordance with the present invention, a method and related system are provided for allowing an individual to manually mark a destination or identifying code which is machine-readable and convertible to a numeric code that can be used by automated sorting or identifying machinery to generate appropriate control signals for controlling its functions. The system is particularly applicable for automated sorting of mail according to Zip codes. This is accomplished by manually applying to an envelope a preprinted or stamped indicia or an adhesive label which incorporates machine-readable markers defining a predetermined code field, and a plurality of rows/columns of delineated blank spaces arranged within the code field, wherein each such row/column is used to designate a respective digit of the Zip code by darkening the corresponding blank spaces.

At the mail receiving end, a code recognition and conversion program is loaded with the mail sorting machinery. When the code-marked envelope is scanned by the machinery, the markers defining the predetermined code field are recognized, the darkened spaces in the predetermined code field designating the digits of the Zip code are recognized and converted to the corresponding numeric code, and the converted numeric code is used by the machinery to control its sorting functions.

As a further feature, the code field markers may include a predetermined indicia-identifying bar code which identifies the code field as one that is manually written. The mail sorting machinery recognizes the identifying bar code in its normal bar-code-recognizing mode, and switches its processing to manually-written code recognition and conversion. The use of the indicia-identifying bar code allows the system to be adapted for recognition and conversion of destination codes of postal office systems in different countries and for sorting mail intended for other countries. The manually-written, machine-readable indicia and recognition/conversion system of the present invention can also be used for other applications besides postal code designations, for example, account number codes, credit card account codes, document, user, or product identification codes, etc.

Other objects, features, and advantages of the present invention will become apparent from the following detailed description of the invention considered in conjunction with the drawings, as follows:

3 destination codes on mail and correspondingly controlling the sorting of mail.

Figure 1:
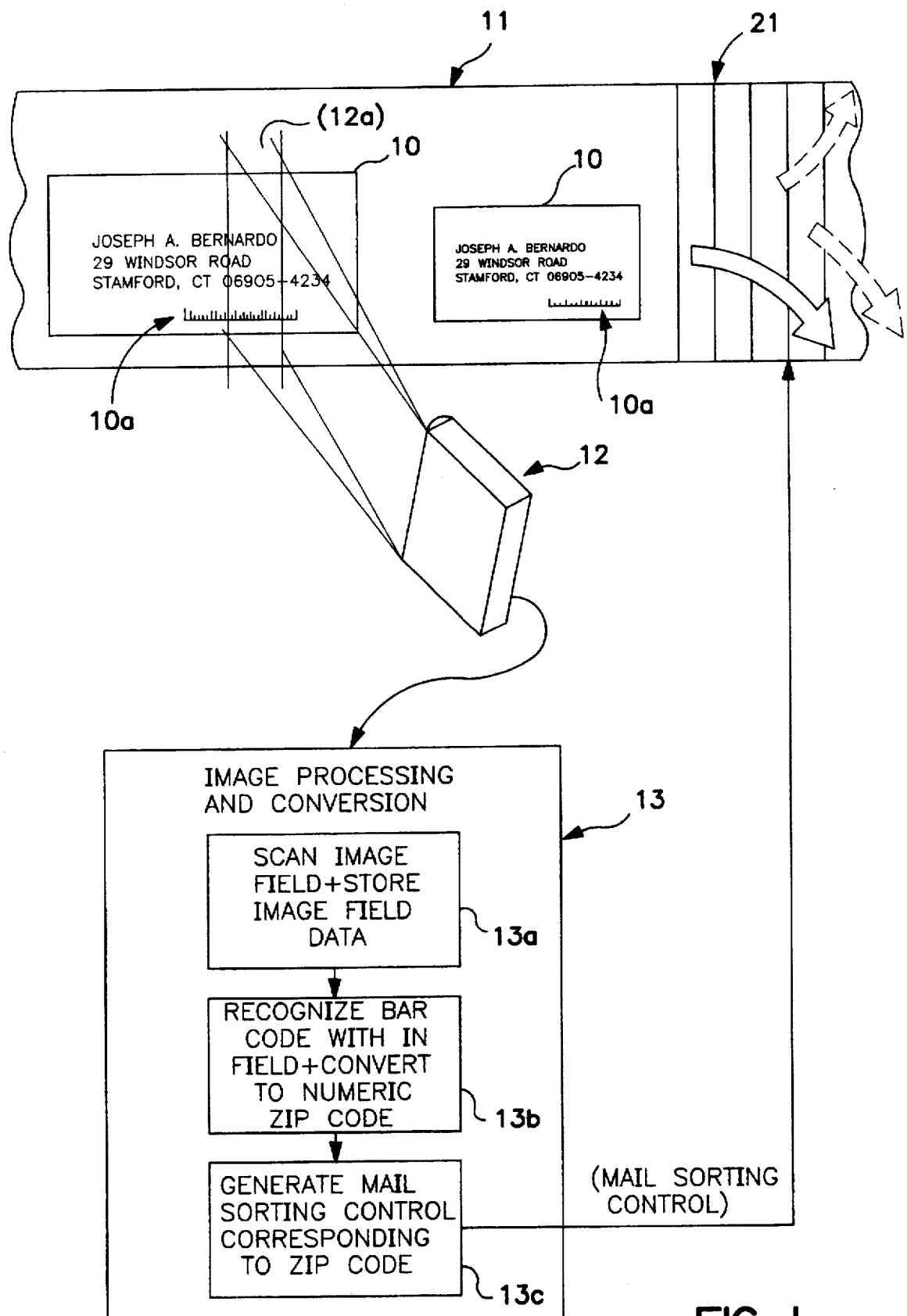
FIG. 1 is a schematic illustration of a conventional automated mail sorting system for recognizing bar-coded
Figure 2:
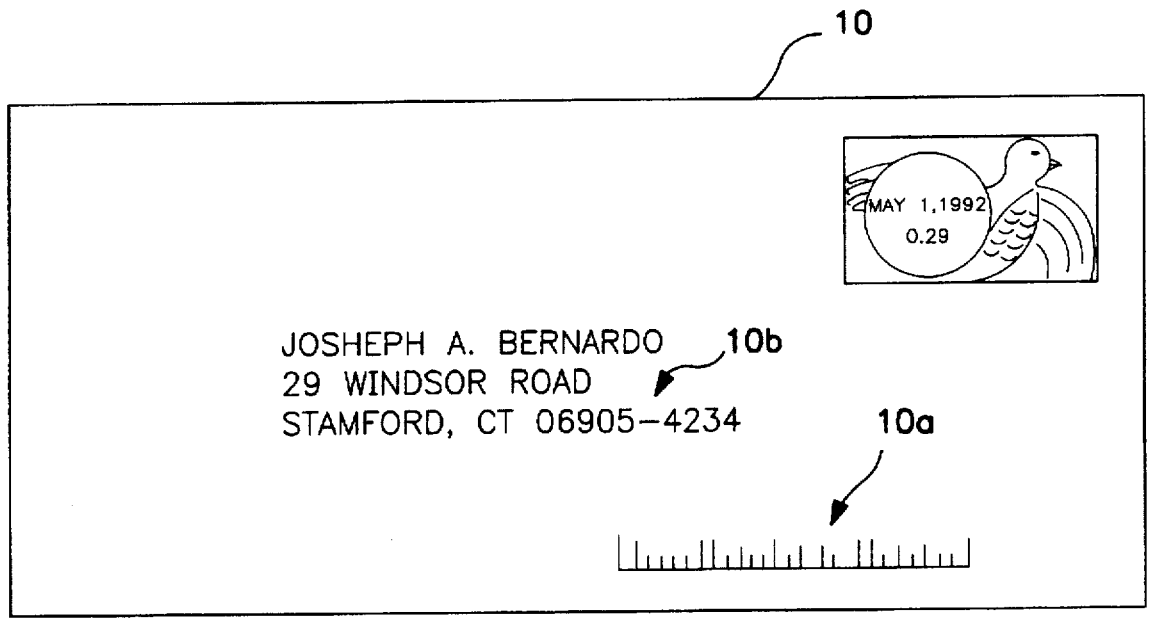

FIG. 2 is an illustration of a typical mail envelope having a bar-coded destination code printed thereon corresponding to the "Zip" code of the address.

Figure 3:
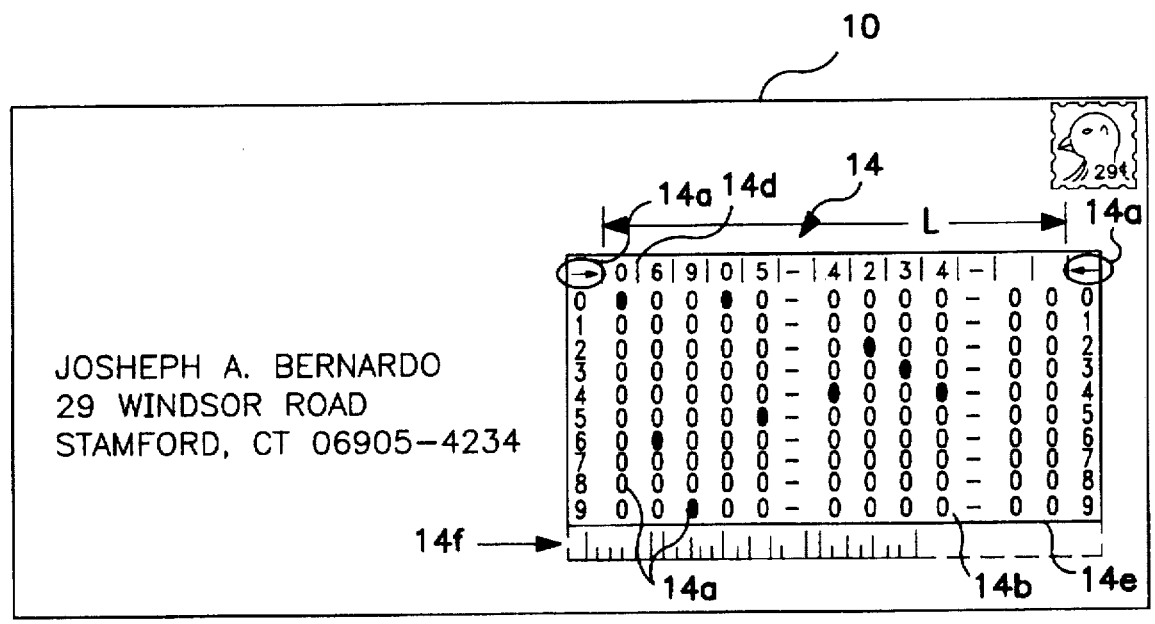

FIG. 3 is an illustration of an envelope marked with the manually-written, machine-readable indicia of the present invention for designating postal Zip codes.

Figure 4:
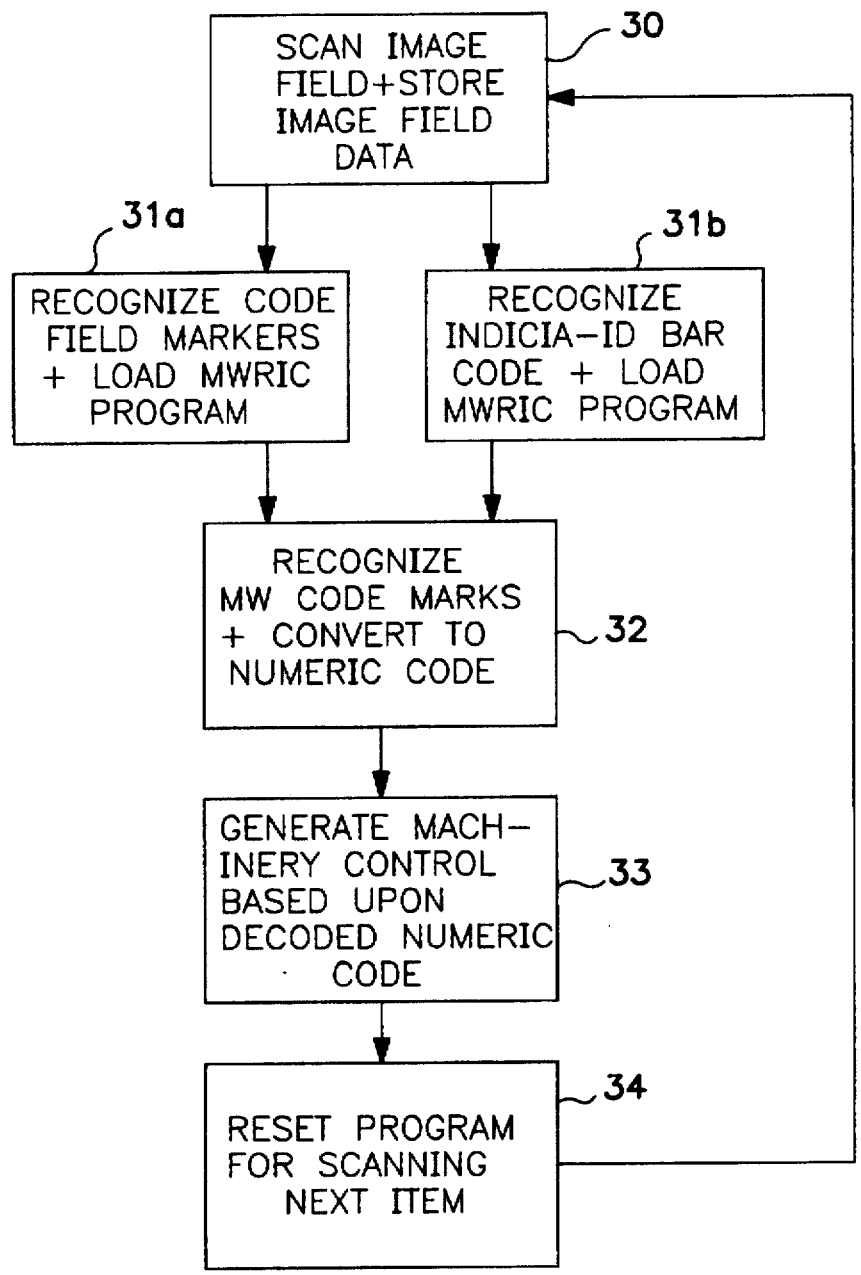

FIG. 4 is a logic diagram illustrating programmed control of automated sorting machinery using the manually-written, machine-readable indicia of the present invention.

Figure 5:
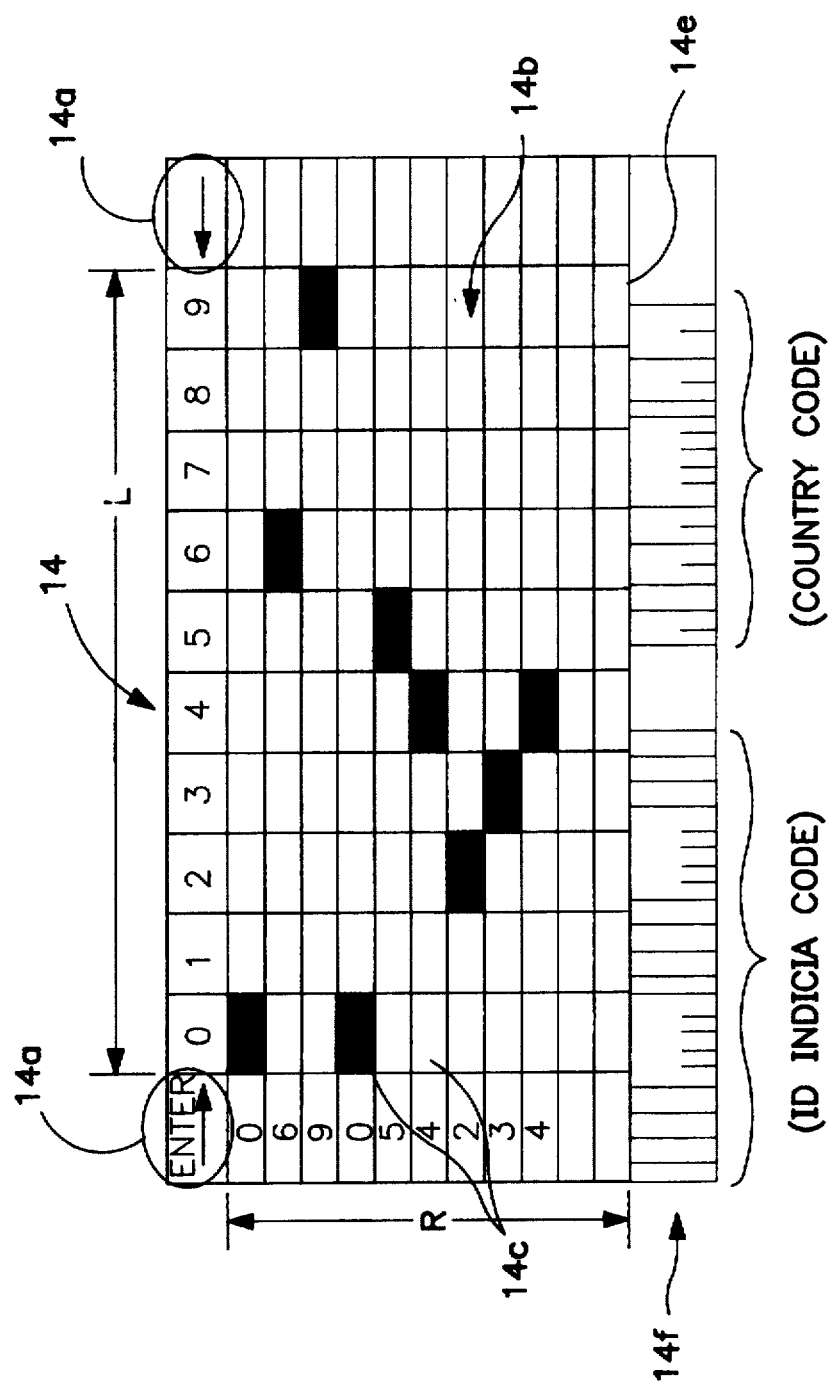

FIG. 5 illustrates another version of the manually-written, machine-readable indicia of the present invention adapted for generic use of different types of postal area codes.

DETAILED DESCRIPTION OF THE INVENTION

The invention provides an overall method and related system for allowing a destination or identifying code to be manually written in a format which is also machine-readable and convertable with very low error rates to a numeric code for automated sorting or identification machinery. A preferred embodiment is described herein applying such method and system to the manual marking of machine-readable Zip code indicia on mail, both envelopes and packages, and for automated recognition and conversion of such indicia to corresponding numeric codes for automated sorting machinery. However, it is to be understood that the principles of the invention are broadly applicable to other fields of automated sorting and/or identification of manually-written, machine readable indicia.

Referring to FIG. 3, manually-written, machine readable indicia is applied to a mail envelope 10 by hand stamping, printing, or applying an adhesive label, as generally indicated by reference numeral 14. In this version, which is adapted for marking Zip codes used by the U.S. Postal Service, the indicia includes code field markers 14a, which can be readily recognized by automated scanning or reading equipment, for designating the position, orientation, and length L of a manually-markable code field 14b between and below the markers 14a. The code field has a plurality of rows or columns of blank spaces for manually marking the digits of the destination or identification code in a format that is readily machine readable. In this example, the length of the code field accommodates the first five numbers of the Zip code, a hyphen, the more specific four numbers of the Zip code, a second hyphen, and two further digits which may be used to indicate the mailing rate, country code, or other Post Office codes. The depth of the code field encompasses ten rows of blank spaces, here, blank circles 14c, for marking the decimal numbers 0-9 corresponding to the Zip code. The dimensions and spacings of the rows of blank spaces may be established beforehand as a standard, and set for programmed reading by the scanning/reading equipment. Alternatively, the positions of the blank spaces 14c may be detected by the positions of the digit markers 14d, and the depth and row spacings may be detected by the lower border 14e of the indicia.

As a further feature, the indicia 14 may include a bar code field 14f which establishes the lower extent of the manually-markable code field 14b and includes a predetermined indicia-identifying bar code sequence, e.g., representing the number sequence 9-0-9-0-9, which can be readily recognized by the reading equipment and used to switch the reading equipment from its normal bar code reading mode to a manually-written code reading mode. It is to be understood

4 that conventional reading equipment operate by scanning a defined field as input graphics data, and a recognition program is used to interpret the input graphics data and recognize code entities in the defined field. Thus, to perform machine recognition of the manually-written code field, the reading equipment switches over from a bar code recognition program to a manually-written code recognition program when the predetermined bar code number sequence has been recognized. The indicia-identifying bar code field 14f may also include a further number sequence designating a particular country in which the indicia has standardized use. For example, if the number sequence designates the United States of America, then the reading of the markings in the code field 14b and conversion to a Zip+4 numeric code can be confirmed.

In FIG. 5, another version of the indicia 14 and code field 14b is shown adapted for generic usage. In this version, the columns of the code field arranged along the length L correspond to the ten decimal digits 0-9, and a given number (11) of rows R of blank spaces are provided for darkening the digits of the postal area codes of a given country. For example, if the indicia-identifying bar code 14f has been pre-coded or pre-printed to designate the indicia as used in the United States of America, then the user may fill in five or nine rows for the U.S. postal Zip codes, and the program control of the automated reader will recognize and convert the corresponding five or nine digits. If the bar code 14f designates another country having a different number of digits in the postal area codes, then the automated reader will be programmed to recognize and convert the corresponding number of digits. Thus, the same system and reading/sorting equipment can be used in different countries for sorting mail destined for that country or other countries. The only requirement is that the user uses a rubber stamp or adhesive labels with the identifying bar code pre-coded or pre-printed to designate the country of intended destination.

At the mail receiving end, a manually-written code recognition and conversion program is loaded with the mail sorting machinery. An example of the basic logic flow of the recognition/conversion program is illustrated in FIG. 4. At step 30, the mail sorting machinery scans the mail envelope in the usual manner. Upon detecting the code field markers 14a, the program control shifts, at step 31a, to a manually-written code recognition and conversion (MWR/C) program. The position, orientation, and length L of the code field 14b are indicated by the markers 14a, and the dimensions and spacings of the rows of blank spaces are either established beforehand as a standard, or determined from the lower border 14e of the indicia. Alternatively, the mail sorting machinery is operated in its normal bar-code-recognizing mode, and upon recognizing the indicia-identifying bar code, the program control is shifted to the MWR/C program corresponding to the particular country designated by the country number code indicated in the indicia-identifying bar code. At step 32, the MWR/C program recognizes the darkened marks among the rows/columns of the code field and converts the data to the corresponding machine-formatted numeric code. At step 33, the program generates the appropriate sorting or identifying machinery control signal based upon the decoded numeric code. At step 34, the program is reset for scanning the next item.

The manually-written indicia of the present invention allows the user to mark the destination (Zip) or identification code on an item in a machine-readable format, without the need for any special bar-code-printing equipment. The destination or identification code is easily marked by darkening the appropriate blank spaces of the code field of the indicia. The indicia can be readily applied to the article by stamping, printing, or by applying adhesive labels. The code recognition and conversion is carried simply by loading an additional program module to the standard automated sorting or identification machinery currently in use. Hand held scanners can be used with the same results as achieved with the automated or scanning equipment previously described. It is also within the scope of the invention for the indicia to include blank spaces for designating the class, for example, first, second, and third class type mail. The convenience and low cost of this approach has the potential for widespread adoption and use, thereby allowing new volumes of mail, transaction records, documents, etc., to be processed automatically.

Numerous modifications and variations are of course possible in light of the principles of the invention disclosed above. All such modifications and variations are intended to be included within the spirit and scope of the invention, as defined in the following claims.

We claim:

1. A method for manually marking a destination or identifying code on an article for automated reading and conversion to a numeric code comprising the steps of:

applying to an article an indicia having machine-readable code field markers defining a predetermined code field, said predetermined code field having a plurality of rows/columns of delineated blank spaces arranged within the code field, manually darkening the blank spaces of the corresponding rows/columns of the code field of the indicia to designate respective digits of a destination or identification code, said blank spaces being darkened so as to be machine readable, and applying to the article in proximity to the indicia a machine-readable bar code representing a predetermined number sequence for indicating that the article has applied thereon the indicia having the code field with manually-darkened spaces designating the destination or identification code, said predetermined number sequence being a numerical code that is recognized by mail-sorting equipment having a bar code reading capability for switching to a manually-written code reading mode for machine-reading of the manually-marked destination code in said predetermined code field.

2. A method according to claim 1, wherein the destination code is a postal area (Zip) code, the article is a mail envelope, and the plurality of rows/columns of delineated blank spaces correspond to a postal area code to be marked on the article.

3. A method according to claim 2, wherein said code field includes at least nine columns corresponding to nine digits of the postal area (Zip) code, and the code field has ten rows of blank spaces corresponding to the decimal digits 0–9.

4. A method according to claim 1, wherein the destination code is a postal area (Zip) code, the article is a package, and the plurality of rows/columns of delineated blank spaces correspond to a postal area code to be marked on the article.

5. A method according to claim 1, wherein the plurality of rows/columns of delineated blank spaces correspond to an article identification code to be marked on the article.

6. A method according to claim 1, wherein the code field markers are spaced apart from each other by a given length L and define the position, orientation, and length of the code field.

7. A method according to claim 1, wherein the destination code is a postal area code, the article is a mail envelope, the plurality of rows/columns of delineated blank spaces correspond to a postal area code to be marked on the article, and the predetermined bar code includes a bar code series for identifying a particular country in which postal area codes of the type to be marked on the article are used.

8. An improvement for manually marking a destination or identifying code on an article for automated reading and conversion to a numeric code, comprising:

indicia-applying means for applying to the article an indicia for manual marking of a destination or identifying code thereon, said indicia applied by said indicia-applying means having:

(a) a first part having machine-readable code field markers defining a predetermined code field, (b) a second part having a plurality of rows/columns of delineated blank spaces arranged within the predetermined code field, wherein the indicia of delineated blank spaces of the corresponding rows/columns are provided to be manually darkened to designate respective digits of the respective destination or identification code, said first and second parts of the indicia of machine-readable code field markers and the delineated blank spaces of the predetermined code field being machine-readable by automated scanning machinery for conversion to a numeric code corresponding to the respective destination or identification code, and (c) a third part adjacent said predetermined code field which is a predetermined bar code representing a predetermined number sequence for indicating that the article has applied thereon the indicia having the code field with manually-darkened spaces designating the destination or identification code, wherein said predetermined number sequence is recognized by automated scanning machinery having bar code reading capability for switching to a manually-written code reading mode for recognition and conversion of said manually-marked destination code in the predetermined code field to a numeric code.

9. An improvement according to claim 8, wherein the indicia applying means is a rubber stamp having the indicia embossed thereon.

10. An improvement according to claim 8, wherein the indicia applying means is an adhesive label having the indicia embossed thereon.

11. An improvement according to claim 8, wherein the code field markers of said indicia are spaced apart from each other by a given length L and define the position, orientation, and length of the code field.

* * * * *